United States Patent Office

2,886,406
Patented May 12, 1959

2,886,406

RECOVERY OF PLUTONIUM AND NEPTUNIUM FROM AQUEOUS SOLUTIONS

Glenn T. Seaborg, Berkeley, Calif., and Roy C. Thompson and Frederic W. Albaugh, Richland, Wash., assignors to the United States of America as represented by the United States Atomic Energy Commission No Drawing. Application April 29, 1952
Serial No. 285,044

7 Claims. (Cl. 23—14.5)

This invention deals with a process for the recovery of neptunium values from aqueous solutions and in particular with a process based on carrier precipitation on bismuth phosphate.

Neptunium is the element having an atomic number of 93. It is obtained in relatively small quantities in neutronic reactors. The isotope $Np^{239}$ is formed according to the following equation:

$$U^{238} + n_0^1 \longrightarrow U^{239} \xrightarrow[\text{23 minutes}]{\beta^-} Np^{239}$$

$Np^{239}$ has the relatively short half-life of two and three-tenths days and decays under beta-emission to $Pu^{239}$ so that storage of $Np^{239}$ brings about decay to a considerable degree. A more stable isotope of neptunium is $Np^{237}$ which is therefore of greater importance with regard to recovery and also of greater interest; it has a half-life of $2.2 \times 10^6$ years. $Np^{237}$ is formed according to the following equations:

$$U^{238} \xrightarrow{n,2n} U^{237} \xrightarrow{\beta^-} Np^{237}$$

and $$U^{235} \xrightarrow{n,\gamma} U^{236} \xrightarrow{n,\gamma} U^{237} \xrightarrow{\beta^-} Np^{237}$$

$Np^{237}$ is an alpha-emitter and as such has manifold uses either as the element or in the form of various compounds. For instance, it may be used for the discovery of neutrons. Neptunium compounds have also the utility as refractories.

In an attempt quantitatively to recover the neptunium produced in neutronic reactors, carrier precipitation processes, and in particular carrier precipitation with bismuth phosphate, have been considered. For the purpose of carrying neptunium values on bismuth phosphate, the neptunium has to be in the tetravalent or trivalent state since neptunium (V), the most stable oxidation state of neptunium, is not carriable on bismuth phosphate. Reduction of neptunium, when present in the pentavalent state, to a lower valence is therefore necessary. However even then, in many instances, the recovery was very unsatisfactory, and frequently this failure was due to a back-oxidation of the neptunium to the pentavalent state. In cases where plutonium was also present in the aqueous solution from which the neptunium was to be separated, the plutonium recovery which is of utmost importance was also impaired particularly when the reducing agents customarily employed prior to plutonium carrier precipitation were used. Thus, for example, when oxalic acid was used as the reducing agent, the neptunium recovery was fair (a loss of between 20% and 30% occurred with the supernatant of the precipitate), but a very high plutonium loss was ascertained. With tetravalent uranium as the reducing agent, a neptunium loss of between 20% and 30% was experienced. With a ferrous ions-containing compound as the reducing agent, the neptunium loss was even as high as 75%.

It is an object of this invention to provide a process for the recovery of neptunium values from aqueous solutions by which a practically quantitative separation is obtained.

It is another object of this invention to provide a process for the simultaneous recovery of neptunium and plutonium values from aqueous solutions in which the neptunium is separated practically quantitatively without impairing the degree of plutonium recovery.

It is still another object of this invention to provide a process for stabilizing the tetravalent state of neptunium contained in aqueous solutions so that a quantitaive carrier precipitation thereof on bismuth phosphate is possible.

It has been found that the selection of a proper reducing agent is of great importance for a quantitative recovery of neptunium values and that this is particularly true if plutonium is to be coprecipitated with the neptunium values. A great number of experiments on carrier precipitation using various reducing agents were carried out; all the solutions used for these experiments contained both, plutonium and neptunium. The results of these experiments are compiled in the following table.

*Table*

| Exp. No. | Pre-reduction | | | Pu in precipitate, percent | Np in precipitate, percent |
|---|---|---|---|---|---|
| | Agents | Concn., M | Time, hrs. | | |
| 1 | NaNO₂ | 0.1 | 1 | 98.3 | 3.3 |
| 2 | {H₂C₂O₄ / Mn (II)} | 0.03 / 0.01 | 1 | 99.5 | 45.3 |
| 3 | {H₂C₂O₄ / Mn (II)} | 0.03 / 0.01 | 1 | 98.0 | 60.0 |
| 4 | {H₂C₂O₄ / Mn (II)} | 0.03 / 0.01 | 1 | 95.1 | 64.1 |
| 5 | {H₂C₂O₄ / Mn (II)} | 0.03 / 0.01 | 2 | 99.6 | 75.7 |
| 6 | {H₂C₂O₄ / Mn (II)} | 0.03 / 0.1 | | | |
| 7 | NH₂OH | 0.1 | 1 | 99.4 | 83.5 |
| 8 | NH₂OH | 0.1 | 1 | 78.7 | 96.8 |
| 9 | NH₂OH | 0.1 | 1 | 71.2 | 99.0 |
| 10 | NH₂OH | 0.05 | 1 | 99.6 | 34.8 |
| 11 | U(SO₄)₂ | 0.01 | 1 | 99.1 | 3.0 |
| 12 | H₂O₂ | 0.01 | 1 | 99.3 | 6.5 |
| 13 | N₂H₄ | 0.009 | 1 | 99.3 | 93.3 |
| 14 | N₂H₄ | 0.001 | 2 | 88.7 | 99.5 |
| 15 | N₂H₄ | 0.001 | 16 | 98.3 | 7.8 |
| | {NaNO₂} | 0.1 | ¼ | 98.8 | 8.0 |
| 16 | {H₂C₂O₄ / Mn (II) / NaNO₂} | 0.03 / 0.01 / 0.1 | 1 | 98.8 | 82.7 |
| 17 | {N₂O₄ / Mn (II) / NaNO₂} | 0.03 / 0.01 / 0.1 | 1 | 97.5 | 65.3 |
| 18 | {H₂C₂O₄ / Mn (II) / NaNO₂} | 0.03 / 0.1 / 0.1 | | | |
| 19 | {NaNO₂ / NH₂OH} | 0.1 / 0.1 | 1 | 98.2 | 88.4 |
| 20 | U(SO₄)₂ | 0.01 | ¼ | 99.6 | 2.6 |
| 21 | {NaNO₂ / U(SO₄)₂} | 0.1 / 0.01 | 1 | 99.1 | 14.8 |
| 22 | {H₂C₂O₄ / Mn (II) / HF} | 0.03 / 0.01 / 0.05 | ½ | 99.2 | 13.7 |
| 23 | {H₂C₂O₄ / Mn (II) / HF} | 0.03 / 0.01 / 0.05 | 1 | 99.6 | 94.9 |
| 24 | {H₂C₂O₄ / Mn (II) / (NH₄)₂SiF₆} | 0.03 / 0.01 / 0.05 | 1 | 99.4 | 89.2 |
| 25 | {H₂C₂O₄ / Mn (II) / (NH₄)₂SiF₆} | 0.03 / 0.01 / 0.05 | 1 | 99.8 | 98.4 |
| 26 | {NaNO₂ / HF} | 0.1 / 0.05 | 1 | 99.4 | 96.9 |
| 27 | {NaNO₂ / (NH₄)₂SiF₆} | 0.1 / 0.05 | 1 | 99.1 | 3.8 |
| 28 | {H₂C₂O₄ / Mn (II) / NaNO₂ / (NH₄)₂SiF₆} | 0.03 / 0.01 / 0.1 / 0.05 | 1 | 98.9 | 8.6 |
| | | | 1 | 99.1 | 96.4 |

It will be readily seen from the data compiled above that hydrazine and hydroxylamine, when used in concentrations that yield a satisfactory neptunium recovery, do not bring about a good plutonium recovery. This is most likely due to reduction of plutonium to the trivalent state which is not as well carriable on bismuth phosphate as is the tetravalent plutonium.

From all of the many reducing agents studied, a combination of oxalic acid and manganous ions used in the presence of a fluorine-containing anion proved the most satisfactory reducing means. In this case, the recovery of plutonium as well as that of neptunium was satisfactory. This combination brought about almost quantitative plutonium and neptunium yields even when employed in the presence of sodium nitrite (experiment 28) which usually has a highly detrimental effect on the recovery when used alone or together with other reducing agents, or even with Mn (II) plus oxalic acid in the absence of a fluoride (see experiments 1, 15–21, 26 and 27 of the table).

The process of this invention thus comprises adding oxalic acid, manganous ions and fluorine-containing anions to an aqueous mineral acid plutonium- and neptunium-containing solution, adding bismuth cations and phosphate anions thereto whereby a plutonium- and neptunium-carrying bismuth phosphate precipitates.

The presence of fluorine-containing anions is of utmost importance in the process of this invention, since they decrease the loss of neptunium values considerably (see data in the table). This is probably due to a complexing reaction of the fluorine-containing anion with the tetravalent neptunium whereby the neptunium is maintained in that valence state. Fluorine-containing anions are also beneficial if the neptunium is to be separated from fission product values admixed therewith in the aqueous solutions. Normally some of the fission product elements, such as zirconium and columbium, coprecipitate with the neptunium on the bismuth phosphate precipitate. In the presence of the fluorine-containing anion, however, the zirconium and columbium are obviously complexed and retained in the aqueous supernatant. A much better separation of the neptunium values from the fission product values is therefore obtained in the presence of a fluorine-containing anion.

While as is also obvious from the table, a fluoride is satisfactory as the fluorine anion-containing substance, better results were obtained with silicofluorides, such as ammonium silicofluoride. The concentration of the fluoride, by which hereinafter is meant a fluoride as well as a silicofluoride, is dependent on the composition and concentration of the aqueous solution and may vary widely. However, it was found that the concentration should be at least 0.02 M, but preferably 0.05 M. The fluoride did not have the same beneficial effect when used in combination with reducing agents other than manganous ions plus oxalic acid. This, for instance, is obvious from the experiments of the table where it is used in combination with sodium nitrite.

The quantity of the oxalic acid should be sufficient to hold the neptunium in the tetravalent state for the time necessary for the neptunium precipitation and separation of the precipitate. Consideration has to be given to the fact that some of the oxalic acid will be destroyed by nitric acid, if this is the acid present in the aqueous solution; this is particularly true when an elevated temperature is employed for the process. While a concentration of oxalic acid as low as 0.03 M was found satisfactory, better results were obtained with a concentration of about 0.1 M.

For example, in one instance a reducing agent combination was used containing a manganous ions-containing substance in a concentration of 0.009 M, 0.047 M oxalic acid and 0.02 M ammonium silicofluoride; it was added to an aqueous solutions containing 15.4% uranyl nitrate hexahydrate, 0.12 M nitric acid, 0.06 M sulfuric acid and 0.6 M phosphoric acid. A substance containing bismuth ions was then added, and the mixture was heated for thirty minutes to 75° C. when a neptunium recovery of 100% was ascertained. After heating had been continued to a total of sixty minutes, however, the neptunium recovery had been reduced to 76%. This is suggestive of a back-oxidation of neptunium to its pentavalent state which most likely is caused by a partial destruction of the oxalic acid. This assumption appears corroborated by another experiment in which about the same conditions were used with the exception of the concentration of oxalic acid which was changed to 0.094 M. In this latter experiment, after heating for thirty-six minutes, the neptunium recovery in the bismuth phosphate precipitate was 95%, while after sixty-six minutes as well as after one hundred twenty-six minutes of heating the neptunium recovery was 100%.

The presence of manganous ions has an especially favorable effect on the plutonium recovery. A concentration of from 0.0075 to 0.01 M was found satisfactory; however, the concentration may vary widely. The manganous ions can be added in the form of various water-soluble salts, such as $Mn(NO_3)_2$, $MnCl_2$, and $MnSO_4$; manganese oxalate and manganese phosphate are also satisfactory and have the advantage that they also contain one or the other anion necessary.

The three compounds, manganous ions-containing salt, oxalic acid and fluoride, are absolutely necessary in order to obtain the favorable effect, in particular with regard to a simultaneous recovery of plutonium and neptunium. None of the three components alone or any combination of two of these components bring about nearly as satisfactory result as the combination of the three ingredients. The reaction is based on a synergistic action the basis of which is not shown.

As has been mentioned before, the solution has to be acid. Any mineral acid is satisfactory for the process of this invention; however, nitric acid is preferred. While the carrier precipitation may be effected at room temperature, heating to about 75° C. for from thirty to sixty minutes proved preferable.

The bismuth phosphate may be incorporated into the solution either by first adding a bismuth-containing compound followed by the addition of a phosphate, or vice versa. One or the other precipitate-forming ingredients may be added prior to the addition of the reducing agent.

One additional advantage of the process of this invention is that sodium nitrite can be present without the detrimental effects mentioned before. Sodium nitrite has been found favorable for the plutonium recovery by carrier precipitation when hydrazine is present in the aqueous solution, because hydrazine tends to reduce the plutonium to the trivalent state which is not as well carriable by bismuth phosphate as is the tetravalent plutonium and sodium nitrite destroys hydrazine. Concentrations of sodium nitrite up to 0.1 M were found to have no detrimental effect on the recovery of neptunium.

The process of this invention has been successfully used in the recovery of neptunium and/or plutonium from the so-called dissolver solutions, which are the solutions obtained by dissolving neutron-bombarded uranium in nitric acid. Neptunium and plutonium can be coprecipitated from such dissolver solutions by the process of this invention and can thereby be separated from the bulk of the fission products and of uranium, the latter being present in nitric acid solutions in the noncarriable hexavalent state.

The process usually followed for the separation of the various elements from dissolver solutions may comprise the addition of the reducing agent combination of this invention and of bismuth cation- and phosphate anion-containing substances whereby a precipitate is formed which carries plutonium values, neptunium values and some of the fission product values, while in the supernatant most of the fission product values and the uranium values remain. The carrier precipitate is then isolated and dissolved in mineral acid, and an oxidizing agent is added thereto by which the neptunium is oxidized to its pentavalent state and plutonium to its hexavalent state. To this oxidized solution are then added bismuth and phosphate ions-containing substances; again a bismuth phosphate precipitate forms which carries the fission products while the oxidized plutonium and neptunium values and only a minor quantity of fission product values remain in the aqueous solution. Then the solution, after removal of the precipitate, is again treated with the reducing agent combination of this invention whereby plutonium and neptunium are reduced to their tetravalent oxidation states. Another bismuth phosphate precipitation then carries the neptunium and plutonium values while the aqueous waste solution contains the remainder of the fission product values.

Instead of first coprecipitating the neptunium and plutonium, the original dissolver solution, which contains the plutonium in the tetravalent state, neptunium in the pentavalent and uranium in the hexavalent state, may be treated with bismuth and phosphate ions without reducing the neptunium. Under these conditions the bulk of the plutonium is carried on the bismuth phosphate precipitate, while the bulk of neptunium and uranium remains in solution. After the separation of the plutonium-containing precipitate, the solution may then be treated by the process of this invention for the neptunium recovery.

These bismuth phosphate precipitates from dissolver solutions, which practically always carry neptunium and plutonium, may then be processed further for the separation of these two actinides by any method known to those skilled in the art. Such separation processes, however, do not form part of this invention.

It will be understood that this invention is not to be limited to the details given herein but that it may be modified within the scope of the appended claims.

What is claimed is:

1. A process of recovering neptunium and plutonium values from an aqueous mineral acid solution, comprising adding oxalic acid, manganous ions and fluorine-containing anions to said solution whereby neptunium and plutonium are secured in their tetravalent state; adding bismuth and phosphate ions whereby a bismuth phosphate precipitate forms, said precipitate carrying the neptunium and plutonium values; and separating said precipitate from said solution.

2. The process of claim 1 wherein the mineral acid is nitric acid.

3. The process of claim 1 wherein the fluorine-containing anion is added in the form of a fluoride.

4. The process of claim 1 wherein the fluorine-containing anion is added in the form of a silicofluoride.

5. The process of claim 1 wherein the bismuth phosphate precipitation is carried out at a temperature of about 75° C. maintained for thirty to sixty minutes.

6. A process for separating neptunium and plutonium from uranium and fission product values contained in an aqueous mineral acid solution, comprising adding oxalic acid, manganous ions and fluorine-containing anions to said solution whereby neptunium and plutonium are secured in their tetravalent state; adding bismuth and phosphate ions to said solution whereby a bismuth phosphate precipitate forms, said precipitate carrying said neptunium and plutonium values while the uranium and fission product values remain in aqueous solution; and separating said precipitate from said solution.

7. A process for recovering neptunium and plutonium values from an aqueous nitric acid solution containing plutonium, neptunium, uranium and fission product values, comprising adding oxalic acid, manganous ions and fluorine-containing anions to said solution whereby neptunium and plutonium are reduced to their tetravalent state; adding bismuth and phosphate ions to said solution whereby a bismuth phosphate precipitate forms, said precipitate carrying said plutonium and neptunium values while the uranium and fission product values remain in aqueous solution; and separating said precipitate from said solution.

References Cited in the file of this patent

UNITED STATES PATENTS

| | | |
|---|---|---|
| 2,785,951 | Thompson et al. | Mar. 19, 1957 |
| 2,799,553 | Thompson et al. | July 16, 1957 |
| 2,799,555 | Morgan | July 16, 1957 |

OTHER REFERENCES

Seaborg: "J.A.C.S.," vol. 70, pages 1128-34 (1948).